(12) United States Patent
Breitfuss et al.

(10) Patent No.: US 8,203,432 B2
(45) Date of Patent: Jun. 19, 2012

(54) METHOD OF READING A PLURALITY OF NON-CONTACT DATA CARRIERS, INCLUDING AN ANTI-COLLISION SCHEME

(75) Inventors: Klemens Breitfuss, Voitsberg (AT); Peter Thueringer, Graz (AT)

(73) Assignee: NXP B.V., Eindhoven (NL)

( * ) Notice: Subject to any disclaimer, the term of this patent is extended or adjusted under 35 U.S.C. 154(b) by 123 days.

(21) Appl. No.: 10/527,287

(22) PCT Filed: Aug. 29, 2003

(86) PCT No.: PCT/IB03/03956
§ 371 (c)(1), (2), (4) Date: Mar. 8, 2005

(87) PCT Pub. No.: WO2004/025544
PCT Pub. Date: Mar. 25, 2005

(65) Prior Publication Data
US 2006/0031546 A1 Feb. 9, 2006

(30) Foreign Application Priority Data
Sep. 11, 2002 (EP) .................. 02102343

(51) Int. Cl.
*G06F 15/16* (2006.01)
(52) U.S. Cl. ............ 340/10.2; 340/572.1
(58) Field of Classification Search ........... 340/10.2, 340/10.34, 10.1, 10.33, 10.3, 10.31, 10.32, 340/10.4, 10.41, 10.42, 10.5, 572.1; 370/458, 370/459, 461
See application file for complete search history.

(56) References Cited

U.S. PATENT DOCUMENTS

| | | | |
|---|---|---|---|
| 6,456,191 B1 * | 9/2002 | Federman | 340/10.2 |
| 6,570,487 B1 * | 5/2003 | Steeves | 340/5.2 |
| 6,714,133 B2 * | 3/2004 | Hum et al. | 340/573.4 |
| 7,016,924 B2 | 3/2006 | Nakabe et al. | |
| 7,187,962 B2 | 3/2007 | Shingo | |

FOREIGN PATENT DOCUMENTS

| | | |
|---|---|---|
| EP | 1 233 531 | 8/2002 |
| JP | 10-222622 A | 8/1998 |
| WO | 99/60510 | 11/1999 |
| WO | 02/21429 A2 | 3/2002 |

\* cited by examiner

*Primary Examiner* — Nabil Syed

(57) ABSTRACT

A method of inventorying data carriers (2) by means of a communication station, whereby the communication station and each data carrier (2) are brought into communicative connection, and each data carrier (2) brought into communicative connection with the communication station is capable of generating a response signal (IDS) that renders possible an inventorying of the data carrier and is capable of delivering a generated response signal (IDS) with the use of a transmission start moment that can be selected from a plurality of transmission start moments (t5, t6), each data carrier tests whether another data carrier (2) is already giving its response signal (IDS). Each data carrier (2) subsequently discontinues the generation or delivery of its response signal (IDS) if another data carrier (2) is already providing its response signal (IDS).

22 Claims, 1 Drawing Sheet

METHOD OF READING A PLURALITY OF NON-CONTACT DATA CARRIERS, INCLUDING AN ANTI-COLLISION SCHEME

The invention relates to a method of inventorying data carriers by means of a communication station, wherein said communication station and each data carrier are brought into communicative connection, and wherein each data carrier brought into communicative connection with the communication station generates a response signal enabling the inventorying of the data carrier after at least one operational condition has been fulfilled and supplies said response signal using a transmission start moment that can be chosen from a plurality of transmission start moments.

The invention further relates to a data carrier which is designed for contactless communication with a communication station and which comprises an integrated circuit, which integrated circuit comprises the following means: response signal generation means for generating a response signal and start moment selection means by which a transmission start moment can be selected from a plurality of transmission start moments.

The invention further relates to an integrated circuit for a data carrier, which data carrier is designed for contactless communication with a communication station, said integrated circuit comprising the following means: response signal generation means for generating a response signal and start moment selection means by which a transmission start moment can be selected from a plurality of transmission start moments.

A method as described in the first paragraph, a data carrier as described in the second paragraph, and an integrated circuit as described in the third paragraph above are known from the document EP 0 957 442 B. This known document discloses a method of inventorying data carriers by means of a communication station, which method is often denoted an anticollision method or anticollision procedure. The communication station, often denoted the reader station, and the known data carrier are brought into communicative connection such that the communication station sends an inquiry information to all data carriers present in a communication field. The sufficient energy supply of the data carriers present in the communication field and the faultless reception of the inquiry information in each data carrier each constitute an operational condition which is to be fulfilled before each respective data carrier generates a response signal which renders possible the inventorying of the relevant data carrier. The inquiry information initializes the start of a sequence of N consecutive time windows both in the reader station and in the data carriers. Each of the N time windows has a given time window duration, which may be fixed or variable. Several sequences of N consecutive time windows are usually generated in a complete anticollision procedure.

Each of the known data carriers comprises a random number generator which randomly lays down one of the N time windows as the return transmission time window, whereby a random transmission start moment is given. The data carrier sends a response information or response signal in the return transmission time window selected by the respective data carrier, which response signal contains the serial number of the data carrier and thus unequivocally characterizes the data carrier. The reader station sends a time window switching information at the end of each time window, such that a switch-over is made from the present time window to the next time window. The reader station identifies the data carriers one after the other and can subsequently, following the completion of the anticollision method, build up and implement a direct communication with one of the data carriers in the communication field each time.

The known solution involves the disadvantage that the entire transaction time for inventorying the known data carriers is comparatively long, because all time windows always have to be worked through.

The invention has for its object to eliminate the above disadvantage and to provide an improved method, an improved data carrier, and an improved integrated circuit.

To achieve the above object, inventive features are provided in a method according to the invention such that a method according to the invention can be characterized as follows:

A method of inventorying data carriers by means of a communication station, wherein said communication station and each data carrier are brought into communicative connection, and wherein each data carrier brought into communicative connection with the communication station generates a response signal enabling the inventorying of the data carrier after at least one operational condition has been fulfilled and supplies said response signal using a transmission start moment that can be chosen from a plurality of transmission start moments, and wherein each data carrier before providing its response signal tests whether another data carrier is already providing its response signal, and wherein each data carrier discontinues the provision of its response signal if another data carrier is already giving its response signal.

To achieve the above object, inventive features are provided in a data carrier according to the invention such that a data carrier according to the invention can be characterized as follows:

A data carrier which is designed for contactless communication with a communication station and which comprises an integrated circuit, which integrated circuit comprises the following means: response signal generation means for generating a response signal and start moment selection means by which a transmission start moment can be selected from a plurality of transmission start moments, and response signal recognition means designed for recognizing a response signal given by another data carrier and for generating and giving off a response signal recognition signal, and wherein delivery decision means are provided which release or block a delivery of the response signal in dependence on the response signal recognition signal and the transmission start moment.

To achieve the above object, inventive features are provided in an integrated circuit according to the invention such that an integrated circuit according to the invention can be characterized as follows:

An integrated circuit for a data carrier, which data carrier is designed for contactless communication with a communication station, said integrated circuit comprising the following means: response signal generation means for generating a response signal and start moment selection means by which a transmission start moment can be selected from a plurality of transmission start moments, and response signal recognition means designed for recognizing a response signal given off by another data carrier and for generating and delivering a response signal recognition signal, and wherein delivery decision means are provided which release or block the delivery of the response signal in dependence on the response signal recognition signal and the transmission start moment.

The provision of the inventive features advantageously and in a simple manner achieves that data carriers can be inventoried significantly faster. This is achieved in particular in that a data carrier, which is brought into communicative connection with the communication station, reacts to other data carriers which are also brought into communicative connection with the communication station, i.e. said data carrier tests whether one of the other data carriers is already giving a response signal, such that the former data carrier will only give its response signal if no other data carrier is already giving a response signal at its transmission start moment.

The inventive features further advantageously achieve that, for example with a small number of data carriers which are brought into communicative connection with a communication station, a response signal can be obtained within a shortest possible period of time with a comparatively high probability, which is desirable and highly advantageous in many applications.

The test as to whether another data carrier is already giving its response signal may take place immediately before the delivery of the response signal for each data carrier in the solutions according to the invention. The test, however, may also take place earlier, for example shortly after the generation of the response signal. It was found to be particularly advantageous when each data carrier already before generating its response signal tests whether another data carrier is giving its response signal, such that each data carrier discontinues the generation of its response signal if another data carrier is already giving its response signal. This is advantageous for achieving the most energy-saving operation of each data carrier.

In the solutions according to the invention, the response signal may be formed by an authentication signal. It was found to be highly advantageous if the identification signal is generated as the response signal, in which case the response signal generation means are formed by identification signal generation means. This is particularly advantageous technically for obtaining as simple as possible a circuit arrangement.

Measures in accordance with an embodiment of the invention provide the advantage that a transmission start moment can be determined in a comparatively simple manner.

Measures in accordance with an embodiment of the invention provide the advantage that a waiting time is exactly defined. This is important and advantageous in particular for the case in which no data carriers are present in the communication range of the communication station.

Measures in accordance with an embodiment of the invention provide the advantage that frequent collisions caused by identical transmission start moments of the data carriers are avoided.

Furthermore, a measure in accordance with an embodiment of the invention advantageously achieves that an already inventoried data carrier does not take part any more in the inventorying process during inventorying of further data carriers, which is very advantageous for making the inventorying as fast as possible.

Furthermore, a measure in accordance with an embodiment of the invention provides the advantage that a recognition of a response signal given off by a data carrier can be achieved by comparatively simple means, i.e. in that a carrier signal delivered along with the response signal is recognized.

Furthermore, a measure in accordance with an embodiment of the invention provides the advantage that the recognition of a response signal can be achieved by comparatively simple means if the data carrier is also constructed as a communication station.

The above and further aspects of the invention will become apparent from the ensuing description of an embodiment and are clarified with reference to this embodiment.

The invention will be explained in more detail below with reference to an embodiment shown in the drawings to which, however, the invention is not limited.

Figure 1:
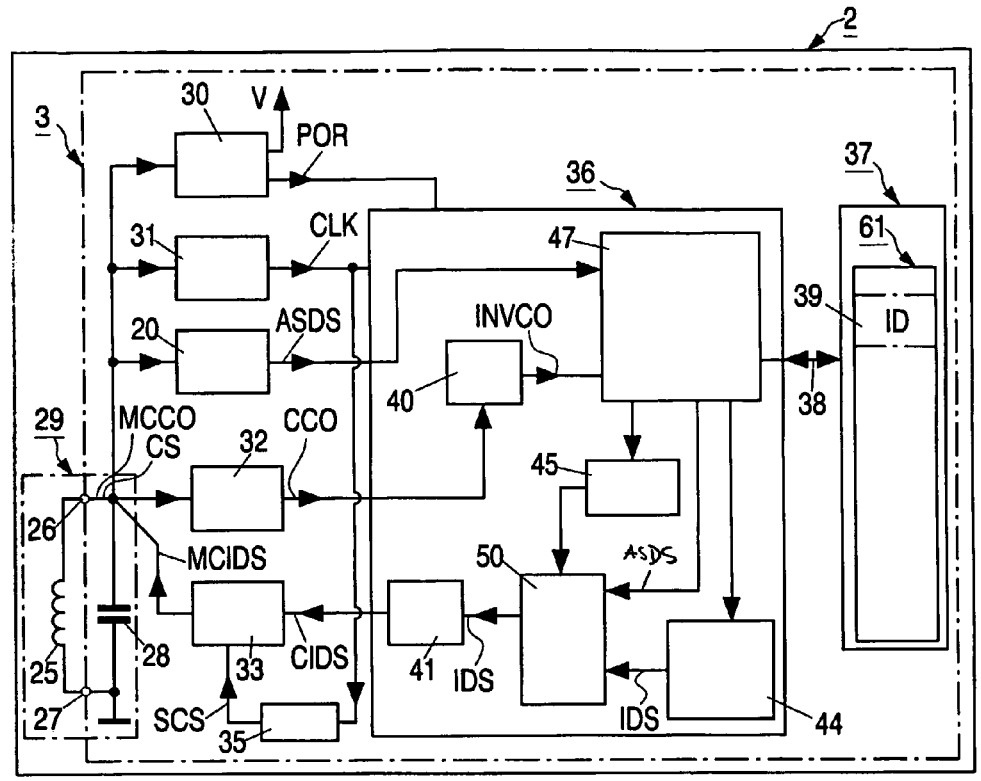
FIG. 1 is a diagrammatic block diagram of a part of a data carrier according to the invention essential in the present context, comprising an integrated circuit according to the invention.

FIG. 1 shows a data carrier 2. The data carrier 2 is designed for contactless communication with a communication station (not shown). A plurality of data carriers 2 are in communicative connection with the communication station in usual applications, such that the data carriers 2 are within a communication range of the communication station. Before reading of data contained in each of the data carriers 2 or writing of data into each of the data carriers 2 can take place, it is necessary to carry out a so-termed inventorying of the plurality of data carriers 2 by means of the communication station which communicates in a contactless manner with the data carriers 2. During such an inventorying process, identification data ID significant for the respective data carrier 2 are transmitted by the respective data carrier 2 to the communication station and stored in the communication station, i.e. for each data carrier 2, so that the identification data ID of all data carriers 2 in communicative connection with the communication station are known in the communication station, which renders it possible for the communication station to come into contact with a respective data carrier 2 in a purpose-oriented and non-interchangeable manner through the use of the identification data ID characteristic of this data carrier 2, for example for reading useful data from the relevant data carrier 2 or storing useful data in the relevant data carrier 2. It is to be noted that identification data ID are not determined for all data carriers 2 that can be brought into communicative connection with the communication station, but that the identification data ID of a data carrier 2 responding first will suffice.

The data carrier 2 comprises an integrated circuit 3 and a transmission coil 25, which transmission coil 25 is connected to a first terminal 26 and a second terminal 27 of the integrated circuit 3. The data carrier 2 is capable of communicating in a contactless manner with the communication station by means of the transmission coil 25. A capacitor 28 forming part of the integrated circuit 3 is connected in parallel to the transmission coil 25. The transmission coil 25 and the capacitor 28 form a tuned circuit which is tuned to an operating frequency and which forms part of data carrier transmission means 29. Instead of the transmission coil 25, the data carrier transmission means 29 may comprise a dipole for transmission. Data carrier transmission means 29 which operate capacitively or optically may alternatively be provided instead of the data carrier transmission means 29 with the transmission coil 25 or with a dipole.

The integrated circuit 3 of the data carrier 2, and accordingly the data carrier 2, comprise supply voltage generation means 30 and clock signal regeneration means 31 and response signal recognition means 20 and demodulation means 32 and modulation means 33. Said five means 30, 31, 20, 32, and 33 are each connected to the data carrier transmission means 29.

The supply voltage generation means 30 serve to generate a supply voltage V by using the signals delivered by the data carrier transmission means 29, i.e. for example by using modulated coded commands MCCO or by using the unmodulated carrier signal CS. The supply voltage V that can be generated by the supply voltage generation means 30 can be supplied to all those components of the integrated circuit 3 which require this supply voltage V, which is not indicated individually in FIG. 2. "Power-on" recognition means 34 are connected to the supply voltage generation means 30, to which means 34 the output signal of the supply voltage generation means 30 can be fed, i.e. the instantaneously generated supply voltage V. The "power-on" recognition means 34 are capable of recognizing whether a sufficiently high supply voltage V is available. If such a sufficiently high supply voltage V is available, the "power-on" recognition means 34 deliver a "power-on" reset signal POR.

The clock signal regeneration means 31 serve to regenerate a clock signal CLK by using the signals delivered by the data carrier transmission means 29, i.e. by using, for example, the modulated coded commands MCCO or by using the unmodulated carrier signal CS. The clock signal regeneration means 31 supply the clock signal CLK. Instead of the clock signal regeneration means 31, an internal oscillator independent of the signals supplied by the data carrier transmission means 29 may be provided, by means of which a clock signal CLK can be generated. Such an internal oscillator is advantageous especially if the communication between a communication station and a data carrier takes place at a very high operating frequency, for example at operating frequencies in the so-called UHF range or the microwave range.

The demodulation means 32 serve to demodulate commands and signals supplied to them, i.e. for example to demodulate the modulated coded commands MCCO. After a demodulation of modulated coded commands MCCO has been completed, the demodulation means 33 supply coded commands CCO.

The modulation means 33 serve to modulate signals, for example to modulate coded identification signals CIDS which can be supplied to the modulation means 33. Furthermore, a subcarrier signal SCS can be supplied to the modulation means 33. A subcarrier signal generator 35 is provided for generating the subcarrier signal SCS, to which generator 35 the clock signal CLK can be supplied by the clock signal regeneration means 31 and which generator 35 generates the subcarrier signal SCS by using the clock signal CLK. When a modulation is carried out, the subcarrier signal SCS is modulated by the modulation means 33, for example in dependence on the coded identification signals CIDS, with the result that the modulation means 33 supply modulated coded identification signals MCIDS which are subsequently transmitted to the communication station by the data carrier transmission means 29 and in this case in particular by the transmission coil 25.

The integrated circuit 3 of the data carrier 2, and accordingly the data carrier 2, comprise a microcomputer 36. A hard-wired logic circuit may be provided instead of the microcomputer 36. The microcomputer 36 serves to realize a range of means and functions of which only those means and functions essential in the present context will be discussed in detail below. The "power-on" reset signal POR and the clock signal CLK can be supplied to the microcomputer 36 for purposes which have long been known to those skilled in the art.

The integrated circuit 3 further comprises storage means 37 which are connected to the microcomputer 36 via a link 38. The storage means 37 comprise an addressable memory 61, which addressable memory 61 comprises a plurality of memory locations, of which only one memory location 39 is identified with dash-dot lines. Identification data ID significant and unique to the data carriers 2 are stored in the memory location 39. A range of further data is stored in the storage means 37, which will not be discussed in any more detail.

Decoding means 40 and coding means 41 are realized by means of the microcomputer 36. The decoding means 40 are designed for decoding commands and signals fed to them, i.e. also for decoding the coded commands CCO. After coded commands CCO have been decoded, the decoding means 40 supply decoded commands, for example the inventory command INVCO. The coding means 41 serve to code signals, for example to code the identification signal IDS. After the identification signal IDS has been coded, the coding means 41 supply a coded identification signal CIDS.

Furthermore, identification signal generation means 44, start moment definition means 45, and delivery decision means 50 are realized by means of the microcomputer 36. The functions of the means 44, 45, and 50 will be discussed in more detail below.

The microcomputer 36 further comprises process control means 47 capable of controlling processes that can be carried out in the microcomputer 36, in particular those related to inventorying of the data carrier 2.

The identification signal generation means 44 serve to generate an identification signal IDS. The identification data ID read from the memory location 39 of the storage means 37 are supplied to the identification signal generation means 44 by means of the process control means 47 such that this identification signal IDS can be generated. The identification signal IDS is generated from the identification data ID and additional data, such as security data. It should be noted here already that the identification signal generation means 44 at the same time form response signal generation means by which a response signal can be generated, which in the present case is also generated from the identification data ID and is formed by the identification signal IDS, which need not necessarily be the case, because the response signal may differ from the identification signal IDS. The identification signal IDS generated by the identification signal generation means 44 must be transmitted from the data carrier 2 to the communication station for the purpose of inventorying.

The process control means 47 are constructed such that they ensure, subsequent to a recognition of an inventory command INVCO among the commands given by the decoding means 40, that the start moment definition means 45 select a transmission start moment from a plurality of transmission start moments, which selection takes place by means of a random generator. It is to be noted that the start moment definition means 45 may also utilize at least a portion of the identification data ID for the selection, in which case such a transmission start moment dependent on the considered portion of the identification data ID is selected by means of an algorithm implemented in the process control means 47.

Figure 2:
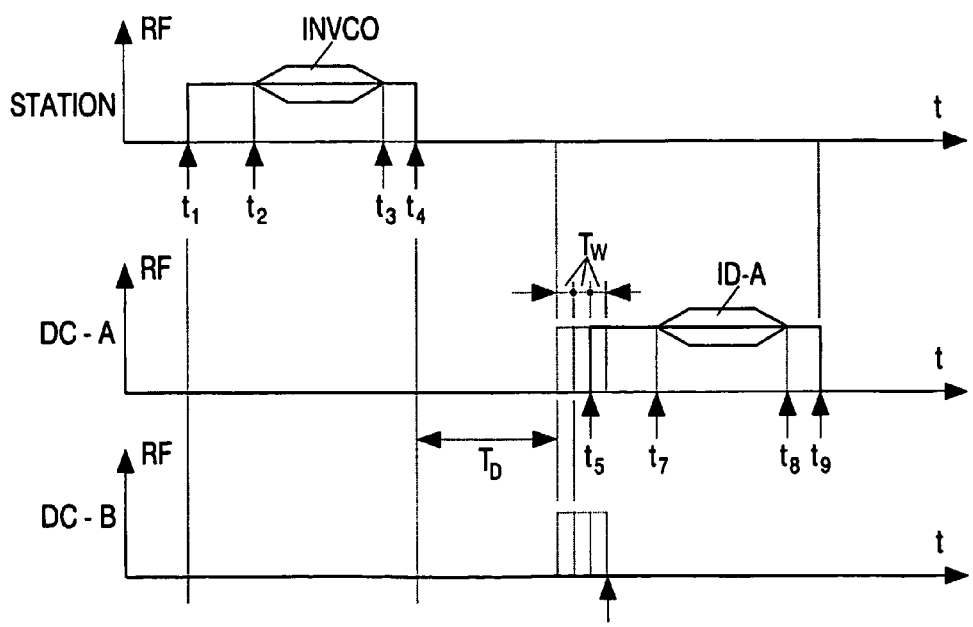
FIG. 2 is a time diagram of the commands and signals occurring during an inventorying procedure.

A method or process for inventorying data carriers 2 by means of a communication station will be described below with reference to FIG. 2. Time sequences of communication signals of both the communication station and the data carrier are shown.

It is assumed that a total of two (2) data carriers, DC-A and DC-B, and one communication station STATION are present in a common communication area at the start of the method of inventorying the data carrier 2. At this start of the method of inventorying the data carriers DC-A and DC-B, the communication station STATION generates the inventory command INVCO in accordance with a defined transmission protocol and transmits it to all data carriers 2. It starts at a moment t1 by transmitting a high-frequency field or a carrier signal, and from a moment t2 up to a moment t3 the inventory command INVCO is sent. The high-frequency field is maintained until a moment t4. During the period from moment t2 to moment t3, the inventory command INVCO is received in the data carriers DC-A and DC-B as explained above with reference to the data carrier transmission means 29, demodulation means 32, and decoding means 40 of the data carrier 2. The time period between the moments t1 and t2 is required for bringing the data carriers DC-A and DC-B from their so-called power-down mode, whereupon the data carrier 2 is initialized. Since the data carriers DC-A and DC-B discussed here are so-called passive data carriers, this time period is also required for generating or building up the supply voltage V.

At moment t4, i.e. after the recognition of the inventory command INVCO in both data carriers DC-A and DC-B, a transmission start moment is determined for each of them. As is apparent from the time diagram of the data carrier DC-A, a transmission start moment t5 was chosen by the start moment definition means 45 for the data carrier DC-A. The transmission start moments in the present case result from the sum of a selectable discrete delay period $T_D$ and a number of waiting time periods $T_W$, starting from the moment t4. The number of waiting periods $T_W$ is determined by a random principle, as was noted above, by the start moment definition means 45. It is possible in the present case to choose up to a number of three (3) waiting periods $T_W$, two (2) waiting periods $T_W$ being chosen for the data carrier DC-A. It is to be noted that the number of waiting periods $T_W$ may vary widely in dependence on the application, such that advantageously the maximum number of selectable waiting periods $T_W$ is double the maximum number of data carriers 2 present in a common communication range with a communication station, so as to avoid frequent collisions.

As is apparent from the time diagram for the data carrier DC-B, a transmission start moment t6 was chosen for this data carrier DC-B, which transmission start moment t6 is one waiting period $T_W$ later than the moment t5.

After the transmission start moment has been determined, it is determined or detected by response signal recognition means 20 in the data carrier DC-A at moment t5 whether a further data carrier 2 present in the common communication range, i.e. in the present case the data carrier DC-B, is sending a response signal. The response signal recognition means 20 then, i.e. in the case of a detected response signal, supply a response signal recognition signal ASDS to the process control means 47. If no response signal recognition signal ASDS is provided, the response signal generation means 44 generate the identification signal IDS-A as was described above. The generated identification signal IDS-A is conducted via the delivery decision means 50 to the coding means 41 and is finally delivered via the data carrier transmission means 29. In the corresponding time diagram in FIG. 2, the delivery of the identification signal IDS-A takes place between a moment t7 and a moment t8, while transient phenomena are taken into account before the moment t7 and after the moment t8 up to a moment t9. It is to be noted that these transient phenomena may vary strongly from system to system and may even be absent.

It is determined or detected in the data carrier DC-B by its response signal recognition means 20 at moment t6 whether a further data carrier 2 present in the common communication range, i.e. the data carrier DC-A in the present case, is sending a response signal. In this case the response signal given by the data carrier DC-A is recognized or detected in that a generated carrier signal occurring along with the provided response signal is recognized. The response signal recognition means 20 of the data carrier DC-B generate a response signal recognition signal ASDS in this case, because the data carrier DC-A is already giving its response signal at moment t6, which response signal recognition signal ASDS achieves via the process control means 47 and the delivery decision means 50 that no identification signal IDS-B will be supplied to the data carrier transmission means 29 via the delivery decision means 50 and furthermore via the coding means 41 and the modulation means 33.

It is thus advantageously achieved in the method described above that a data carrier, i.e. the data carrier DC-A in this case, has been inventoried or selected by a communication station in as short a time as possible. This is advantageous, for example, if a communication station is to start a service the moment at least one data carrier enters the communication range of the communication station. Such a service may be, for example, an advertising action or something similar.

If so desired, the data carrier DC-B may now be inventoried, for which purpose the communication station once more sends an inventory command INVCO, and the data carrier DC-B is inventoried in accordance with the method described above. Advantageously, the data carrier DC-A is set to an idle position before the communication station provides the inventory command INVCO, in which idle position the data carrier DC-A does not react any more to the inventory command INVCO.

If the same transmission start moment is determined in both data carriers DC-A and DC-B, and accordingly a response signal is transmitted at the same time, the communication station is constructed for recognizing several response signals and for interrupting the inventory, and possibly restarting the inventory by means of a renewed delivery or transmission of the inventory command INVCO.

It is to be noted that the communication station may at the same time be formed by a data carrier, in which case such a data carrier has the same means for communicating with other data carriers as a communication station.

It may furthermore be noted that a method according to the invention may be implemented among a plurality of communication stations.

The invention claimed is:

1. A method of inventorying data carriers by means of a communication station,
wherein said communication station and each data carrier among said data carriers are brought into communicative connection, and wherein each data carrier brought into communicative connection with the communication station generates a response signal after at least one operational condition has been fulfilled and supplies said response signal to a modulation means for modulating the response signal for transmission to enable the inventorying of said each data carrier, wherein said each data carrier, before generating its response signal from identification data and additional data, tests whether another data carrier is giving its response signal, wherein said each data carrier discontinues the generation of its response signal from the identification data and the additional data if said another data carrier is already giving its response signal to achieve an energy-saving operation, and wherein, if no response signal of said another data carrier is provided, the response signal is generated from the identification data and the additional data and supplied to the modulation means and delivered via a data carrier transmission means, wherein the generation of the response signal is performed prior to modulating the response signal via the modulation means for transmission.

2. A method as claimed in claim 1, wherein the additional data used to generate the response signal includes security data.

3. A data carrier, said data carrier is designed for contactless communication with a communication station and said data carrier comprises an integrated circuit, wherein said integrated circuit comprises following means:
response signal generation means for generating a response signal,
start moment selection means by which a transmission start moment can be selected from a plurality of transmission start moments, and
response signal recognition means designed for recognizing a response signal given by another data carrier and for generating and delivering a response signal recognition signal and wherein delivery decision means are provided which release or block a delivery of the response signal in dependence on the response signal recognition signal and the transmission start moment,
wherein said data carrier is configured to test, before generating its response signal from identification data and additional data, whether said another data carrier is giving its response signal, wherein said data carrier is configured to discontinue the generation of its response signal from the identification and the additional data if said another data carrier is already giving its response signal to achieve an energy-saving operation,
and wherein said data carrier is configured such that, if no response signal of said another data carrier is provided, the response signal is generated from the identification data and the additional data and supplied to a modulation means and delivered via a data carrier transmission means,
wherein the generation of the response signal is performed prior to modulating the response signal via the modulation means for transmission.

4. A data carrier as claimed in claim 3, wherein the selected transmission start moment is shifted in time by a selectable discrete delay period with respect to the end of a command signal given by the communication station.

5. A data carrier as claimed in claim 3, wherein number of selectable transmission start moments is greater than number of data carriers.

6. A method as claimed in claim 1, wherein a data carrier that has given a response signal can be set to an idle state by the communication station, in which idle state no response signal is provided.

7. A data carrier as claimed in claim 3, wherein the transmission start moment is selected by a random principle.

8. A data carrier as claimed in claim 3, wherein the additional data used to generate the response signal includes security data.

9. A data carrier as claimed in claim 3 or 8, wherein the response signal recognition means are designed for recognizing a carrier signal.

10. A data carrier as claimed in claim 3, wherein the response signal recognition means are designed for recognizing a modulated carrier signal and for this purpose comprise demodulation means which are designed for demodulating a modulated carrier signal.

11. An integrated circuit for a data carrier, the data carrier is designed for contactless communication with a communication station, said integrated circuit comprising following means:
response signal generation means for generating a response signal,
start moment selection means by which a transmission start moment can be selected from a plurality of transmission start moments,
wherein the data carrier is configured to test, before generating its response signal from identification data and additional data, whether another data carrier is giving its response signal, wherein the data carrier is configured to discontinue the generation of its response signal from the identification and the additional data if said another data carrier is already giving its response signal to achieve an energy-saving operation, and
wherein the integrated circuit is configured such that, if no response signal of said another data carrier is provided, the response signal is generated from the identification data and the additional data and supplied to a modulation means and delivered via a data carrier transmission means,
wherein the data carrier is configured to generate the response signal prior to the response signal being modulated by the modulation means for transmission.

12. An integrated circuit as claimed in claim 11, wherein the additional data used to generate the response signal includes security data.

13. An integrated circuit as claimed in claim 11, wherein the response signal recognition means are designed for recognizing a carrier signal.

14. An integrated circuit as claimed in claim 11, wherein the response signal recognition means are designed for recognizing a modulated carrier signal and for this purpose comprise demodulation means which are designed for demodulating a modulated carrier signal.

15. A method of inventorying data carriers, which method comprises the following steps:
choosing from a plurality of transmission start moments a transmission start moment for starting a transmission of a response signal for the purpose of supplying data from a data carrier to a communication station, wherein the data enables the inventory of the data carrier;
testing at the data carrier, before generating a response signal from identification data and additional data, whether another data carrier is already transmitting its response signal;
if said another data carrier is already transmitting its response signal, discontinuing the generation of the response signal from the identification data and the additional data at the data carrier to achieve an energy-saving operation; and
if no other data carrier is already transmitting its response signal, generating the response signal from the identification data and the additional data and supplying the generated response signal to a modulation means and transmitted from the data carrier to the communication station,
wherein the generation of the response signal is performed prior to modulating the response signal for transmission.

16. A method as claimed in claim 15, wherein the additional data used to generate the response signal includes security data.

17. A method as claimed in claim 16, comprising transmitting the response signal between two time periods to take into account trasient phenomena.

18. A method as claimed in claim 15, wherein the transmission start moment is selected by a random principle.

19. A method as claimed in claim 15, wherein said choosing of said transmission start moment allows the number of choose-able transmission start moments to be greater than the number of data carriers.

20. A method as claimed in claim 15, further comprising transmitting an inventory command from the communication station.

21. A method as claimed in claim 20, wherein said choosing of the transmission start moment comprises shifting said transmission start moment in time by a selectable discrete delay period.

22. A method as claimed in claim 16, comprising setting said data carrier that has supplied its data as identification data into an idle state by the communication station, in which idle state no carrier signal is transmitted.

* * * * *